(12) United States Patent
Imaki et al.

(10) Patent No.: US 7,337,187 B2
(45) Date of Patent: Feb. 26, 2008

(54) XML DOCUMENT CLASSIFYING METHOD FOR STORAGE SYSTEM

(75) Inventors: Tsuneyuki Imaki, Tokyo (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 388 days.

(21) Appl. No.: 10/933,223

(22) Filed: Sep. 3, 2004

(65) Prior Publication Data

US 2005/0198060 A1    Sep. 8, 2005

(30) Foreign Application Priority Data

Mar. 4, 2004    (JP)    .............................. 2004-059985

(51) Int. Cl.
*G06F 17/30*    (2006.01)
(52) U.S. Cl. ...................... 707/102; 707/6; 707/103 R; 707/103 Y
(58) Field of Classification Search .................. 707/102
See application file for complete search history.

(56) References Cited

U.S. PATENT DOCUMENTS

| | | | |
|---|---|---|---|
| 7,149,694 B1* | 12/2006 | Harb et al. ............... | 704/270.1 |
| 2001/0049675 A1* | 12/2001 | Mandler et al. ............... | 707/1 |
| 2002/0116412 A1* | 8/2002 | Barnes et al. ............... | 707/513 |
| 2003/0018646 A1* | 1/2003 | Ohta et al. ................... | 707/100 |
| 2004/0093561 A1* | 5/2004 | Yeh et al. ..................... | 715/513 |

* cited by examiner

*Primary Examiner*—Wilson Lee
*Assistant Examiner*—Binh V Ho
(74) *Attorney, Agent, or Firm*—Antonelli, Terry, Stout & Kraus, LLP.

(57) ABSTRACT

An XML document classifying method includes the steps of: classifying a plurality of XML documents stored in a storage unit, depending on whether a specific element/attribute is present in the XML documents and based on the identity of the value of the element/attribute; generating a folder hierarchical expression wherein the XML documents are sorted and arranged into folders; and providing the folder hierarchical expression for a hierarchical file GUI.

12 Claims, 9 Drawing Sheets

```
<transaction>
  <user>tanaka</user>
  <date>00-01-23</date>
</transaction>
```
a.xml  201

```
<personal>
  <user name="suzuki">
    <address/>
    <telephone/>
    <job/>
  </user>
  <date>02-03-05</date>
  <type>query</type>
</personal>
```
b.xml  202

```
<query>
  <usr>
    <name>
      tanaka
    </name>
    <address/>
    <job/>
  </usr>
  <date>01-05-08</date>
</query>
```
c.xml  203

```
<file>
  <usr>
    <name>
      <first>koichi</first>
      <last>tanaka</last>
    </mame>
    <birthday/>
  </usr>
  <date>02-08-30</date>
</file>
```
d.xml  204

```
<personal>
  <user name="tanaka">
    <job>research</job>
  </user>
  <date>02-12-10</date>
  <type>update</type>
</personal>
```
e.xml  205

```
<transaction>
  <user>suzuki</user>
  <date>02-02-03</date>
</transaction>
```
f.xml  206

```
<transaction>
  <user>tanaka</user>
  <date>03-03-25</date>
</transaction>
```
g.xml  207

```
<query>
  <usr>
    <name>
      suzuki
    </name>
    <tel/>
    <division/>
  </usr>
  <date>02-06-09</date>
</query>
```
h.xml  208

```
<personal>
  <user name="suzuki">
    <address/>
    <telephone/>
  </usr>
  <date>02-02-08</date>
  <type>query</type>
</personal>
```
i.xml  209

FIG. 3

| | ID | TYPE | VALUE | PID | FILE |
|---|---|---|---|---|---|
| 1 | a:/1 | TAG | transaction | a: | a.xml |
| 2 | a:/1/0 | CMP | null | a:/1 | a.xml |
| 3 | a:/1/1 | TAG | user | a:/1 | a.xml |
| 4 | a:/1/1/1 | PCD | tanaka | a:/1/1 | a.xml |
| 5 | a:/1/2 | TAG | date | a:/1 | a.xml |
| 6 | a:/1/2/1 | PCD | 00-01-23 | a:/1/2 | a.xml |
| 7 | b:/1 | TAG | personal | b: | b.xml |
| 8 | b:/1/0 | CMP | null | b:/1 | b.xml |
| 9 | b:/1/1 | TAG | user | b:/1 | b.xml |
| 10 | b:/1/1/0 | CMP | null | b:/1/1 | b.xml |
| 11 | b:/1/1/1 | ATR | name | b:/1/1 | b.xml |
| 12 | b:/1/1/1/1 | PCD | suzuki | b:/1/1/1 | b.xml |
| 13 | b:/1/1/2 | TAG | address | b:/1/1 | b.xml |
| 14 | b:/1/1/2/0 | VAC | null | b:/1/1/2 | b.xml |
| 15 | b:/1/1/3 | TAG | telephone | b:/1/1 | b.xml |
| 16 | b:/1/1/3/0 | VAC | null | b:/1/1/3 | b.xml |
| 17 | b:/1/1/4 | TAG | job | b:/1/1 | b.xml |
| 18 | b:/1/1/4/0 | VAC | null | b:/1/1/4 | b.xml |
| 19 | b:/1/2 | TAG | date | b:/1 | b.xml |
| 20 | b:/1/2/1 | PCD | 02-03-05 | b:/1/2 | b.xml |
| 21 | b:/1/3 | TAG | type | b:/1 | b.xml |
| 22 | b:/1/3/1 | PCD | query | b:/1/3 | b.xml |
| 23 | c:/1 | TAG | query | c: | c.xml |
| 24 | c:/1/0 | CMP | null | c:/1 | c.xml |
| 25 | c:/1/1 | TAG | usr | c:/1 | c.xml |
| 26 | c:/1/1/0 | CMP | null | c:/1/1 | c.xml |
| 27 | c:/1/1/1 | TAG | name | c:/1/1 | c.xml |
| 28 | c:/1/1/1/1 | PCD | tanaka | c:/1/1/1 | c.xml |
| 29 | c:/1/1/2 | TAG | address | c:/1/1 | c.xml |
| 30 | c:/1/1/2/0 | VAC | null | c:/1/1/2 | c.xml |
| 31 | c:/1/1/3 | TAG | job | c:/1/1 | c.xml |
| 32 | c:/1/1/3/0 | VAC | null | c:/1/1/3 | c.xml |
| 33 | c:/1/2 | TAG | date | c:/1 | c.xml |
| 34 | c:/1/2/1 | PCD | 01-05-08 | c:/1/2 | c.xml |
| 35 | d:/1 | TAG | file | d: | d.xml |
| 36 | d:/1/0 | CMP | null | d:/1 | d.xml |
| 37 | d:/1/1 | TAG | usr | d:/1 | d.xml |
| 38 | d:/1/1/0 | CMP | null | d:/1/1 | d.xml |
| 39 | d:/1/1/1 | TAG | name | d:/1/1 | d.xml |
| 40 | d:/1/1/1/0 | CMP | null | d:/1/1/1 | d.xml |
| 41 | d:/1/1/1/1 | TAG | first | d:/1/1/1 | d.xml |
| 42 | d:/1/1/1/1 | PCD | koichi | d:/1/1/1/1 | d.xml |
| 43 | d:/1/1/1/2 | TAG | last | d:/1/1/1 | d.xml |
| 44 | d:/1/1/1/2/1 | PCD | tanaka | d:/1/1/1/2 | d.xml |
| 45 | d:/1/1/2 | TAG | birthday | d:/1/1 | d.xml |
| 46 | d:/1/1/2/0 | VAC | null | d:/1/1/2 | d.xml |
| 47 | d:/1/2 | TAG | date | d:/1 | d.xml |
| 48 | d:/1/2/1 | PCD | 02-08-30 | d:/1/2 | d.xml |

XML DOCUMENT CLASSIFYING METHOD FOR STORAGE SYSTEM

CLAIM OF PRIORITY

The present application claims priority from Japanese application JP2004-059985 filed on Mar. 4, 2004, the content of which is hereby incorporated by reference into this application.

BACKGROUND OF THE INVENTION

The present invention relates to a storage system, and relates in particular to a method for classifying a plurality of XML documents stored in a storage system, especially for a file view generation method for facilitating hierarchical classifying of documents based on the contents, and a graphical user interface therefor (hereinafter referred to as a GUI).

Generally, files stored in a storage system, which uses storage means such as a hard disk, NAS (Network Attached Storage) or RAID (Redundant Array of Independent Disks storage), are sorted into folders (directories) and provided as a view by a file system such as FAT, NTFS, CIFS, UNIX ™ file system and NFS. In the view provided in common by these file systems, the folders are hierarchically arranged in a tree structure, and to select an arbitrary file, a user enters as an instruction for an operating system a path (to a location), through the hierarchical structure of a file system, in the hierarchical structure, that extends from the vertex to the file. The user can sort and store a plurality of files in each folder prepared in the hierarchical structure.

However, for a classifying method that mainly employs locations, a user must appropriately determine the contents of a file and arrange it in the correct folder, and must also correctly remember the hierarchical structure for the folders that have been prepared. Generally, as the number of files is increased, the hierarchical structure for the folders becomes complicated and it is difficult for a user to remember, and when the user incorrectly determines the contents or the arrangement to be used for a file, finding the file becomes extremely difficult.

Furthermore, when the conventional classifying method is used, once files have been classified, rearranging them, from a different viewpoint, is troublesome. For example, when files classified into folders for a file creator are to be rearranged in accordance with creation dates and types, new folders must be prepared and files rearranged and classified in the new folders by copying the files or by establishing links.

In addition, to identify a file arranged in a different computer on a network, the name of the computer must be specified. Since the computer wherein a file is arranged is changed in accordance with the backup function and the migration function of the storage system, a conventional classifying method that mainly employs locations can not cope with these functions.

As another method for classifying files in accordance with the file contents, regardless of their locations, a file search technique is available for performing a full-text keyword search. However, since this technique does not take into consideration the meaning of the keyword, files can merely be sorted in accordance with whether the keyword is present/absent.

It is predicted that XML (eXtensible Markup Language) documentation, such as SOAP (Simple Object Access Protocol), for data will be promoted as Web service is expanded. Because with XML documentation data meanings of data are provided by using tags, and for a file access method contents are designated, a higher function than the full-text keyword search function is expected.

The standard specifications, such as XPath (http://www.w3.org/TR/path20/) and XQuery (http://www.w3.org/XML/Query), are present as methods for describing a search form for XML. Further, in U.S. Patent Application Publication No. US 2001/0049675 titled "FILE SYSTEM WITH ACCESS AND RETRIEVAL OF XML DOCUMENTS", disclosed is a file view providing a method whereby the overall grammatical structure of an XML document is obtained by mapping it onto a similar hierarchical folder structure in a file system.

SUMMARY OF THE INVENTION

XPath is an expression form for a node (element, attribute or text) hierarchical pattern in an XML document, and a group of nodes that match a pattern written in the expression form is extracted from a specific document. A plurality of XML documents can be sorted, depending on whether a node that matches a specific XPath expression is present in an XML document. It should be noted, however, that a user must understand the grammatical structure, such as a DTD definition or an XML Schema definition, of a target XML document in order to describe an Xpath expression. In addition, when the XPath expression must be written as text, usability is deteriorated.

On the other hand, according to the embodiment described in US Patent Application Publication No. 2001/0049675, an example file system is proposed wherein a file view, provided by the proposed method, can be obtained by inserting it into a hierarchical file GUI (the hierarchical file GUI is one, such as Windows Explorer (Trademark), that provides a file hierarchical expression having a tree structure). According to this file system, the user can access a file by employing a conventional file GUI, without writing an XPath expression. It should be noted, however, that the grammatical structure must be the same for all the XML documents to be sorted, and as well as for the XPath, the user must understand the grammatical structure.

While taking the above problems of the conventional technique into account, a technique that can satisfy the following requirements is required.

First, a plurality of XML documents having different grammatical structures can be sorted from the viewpoint of each user.

Second, this operation can be performed without understanding these grammatical structures.

Third, this operation can be performed through a conventional hierarchical file GUI.

Therefore, it is one objective of the present invention to provide functions that satisfy the first, second and third requirements, by being added to a hierarchical file GUI.

Functions for performing the following processes are added to a hierarchical file GUI.

(1) When a user instructs the preparation of a folder (hereinafter referred to as an initial element folder) having a specific character string (hereinafter referred to as an initial character string) as a name, all the XML documents are selected that include an element (hereinafter referred to as a initial element) having the initial character string as a name. The XML documents that have the initial element whose only child is a character string (hereinafter the character string being referred to as an element value) are sorted in accordance with the identity of the element values. Then, immediately under the initial element folder, folders (hereinafter referred to as element value folders) are prepared that have the individual element values as names, and the sorted XML documents are arranged in the individual element value folders.

(2) When the initial element has an attribute group, folders (hereinafter referred to as attribute folders) having attribute names are arranged for the individual attributes. When the initial element includes elements (hereinafter referred to as subordinate elements) as children, folders (hereinafter referred to as subordinate element folders) having the names of the individual subordinate elements are arranged immediately under the initial element folder.

(3) When a user opens a specific attribute file, the XML documents are sorted in accordance with the identity of the attribute value of the pertinent attribute. Then, folders (hereinafter referred to as attribute value folders) having the individual attribute values as names are prepared immediately under the specific attribute folder, and the sorted XML documents are arranged in the attribute value folders.

(4) When a user opens a specific subordinate element folder, the name of the subordinate element folder is changed into a initial character string, and processes (1) and (2) described above are performed.

(5) When a user manipulates a mouse to designate two arbitrary element value folders or attribute value folders (hereinafter collectively referred to as value folders), one of the value folders (hereinafter referred to as a value synonymized folder) is synonymized with the other value folder (hereinafter referred to as a value synonymizing folder). The value synonymization is a process for arranging, also in a value synonymizing folder, all the XML documents arranged in the value synonymized folder.

(6) When a user manipulates a mouse to arbitrarily designate two folders from initial element folders, subordinate element folders (hereinafter the two are referred to as element folders) or attribute folders (hereinafter the three are referred to as variable folders), one of the variable folders (hereinafter referred to as a variable synonymized folder) is synonymized with the other variable folder (hereinafter referred to as a variable synonymizing folder). The variable synonymization is the following process:

For each value folder present immediately under the variable synonymized folder, when a value folder having the same name as the value folder is present immediately under the variable synonymizing folder, all the XML documents arranged in the value folder immediately under the variable synonymized folder are also arranged in the value folder immediately under the variable synonymizing folder. When there is no value folder having the same name as the value folder present immediately under the variable synonymized folder, a value folder having the same mane is prepared immediately under the variable synonymizing folder, and all the XML documents arranged in the value folder of the variable synonymized folder are also arranged in the newly prepared value folder.

(7) When a user prepares, in a variable folder, a value folder having a designated condition as a name, only XML documents for which the variable satisfies the condition are arranged in the value folder.

(8) When a user prepares a new initial element folder in a value folder, only XML documents arranged in this value folder are further sorted by the processes (1) to (7).

The following effects can be obtained for the present invention.

(1) The documents can be sorted in accordance with the presence/absence of an arbitrary element and the identify of the value.

(2) Since an attribute type and the presence/absence of a child element or an attribute present under a specific element are presented to a user, the user can select a relevant attribute or element from among those presented.

(3) The documents can also be sorted in accordance with the identify of an attribute value.

(4) The documents can be sorted based on the recursive hierarchical structure of the XML document.

(5) Because of the XML grammar, a combination of different elements or attributes and values can be established as having the same meaning.

(6) Because of the XML grammar, different elements or attributes can be put together as having the same meaning, and the documents can be sorted in accordance with the identity of the element or attribute values.

(7) A condition search can be performed for the values of elements or attributes.

(8) The classification can be nested hierarchically.

The effects (1) to (4) facilitate the classifying of XML documents, without an understanding of the grammatical structure of the XML document being required. The effects (5) and (6) facilitate the classifying of all the documents having different grammatical structures. The effects (7) and (8) facilitate the classifying from the viewpoint of each user.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing the example XML documents stored in a relational database according to the embodiment of the invention;

DESCRIPTION OF THE EMBODIMENTS

One mode of the present invention will now be described while referring to the accompanying drawings. To simplify the specifications, the following mode of the present invention is merely referred to as the embodiment.

Figure 1:
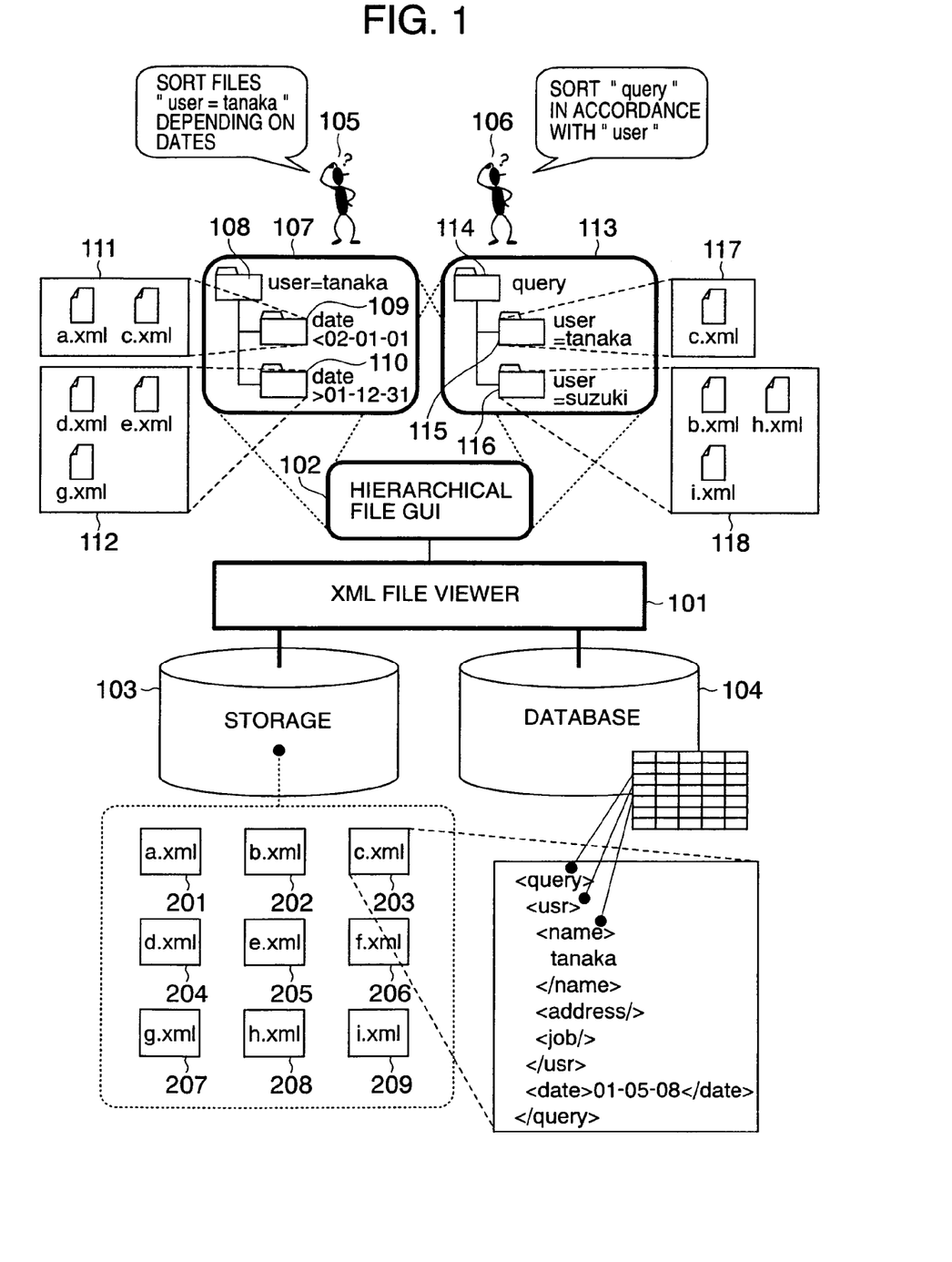
FIG. 1 is a diagram showing the overall configuration according to one embodiment of the present invention.

An overview of the embodiment will now be described while referring to FIGS. 1 and 2.

In this embodiment, roughly two components, an XML file viewer 101 and a hierarchical file GUI 102, are employed. The XML file viewer 101 is software for classifying a plurality of XML documents stored in a storage unit 103. To perform the classifying efficiently, the contents of the XML documents are stored in a database 104. The hierarchical file GUI 102 notifies the XML file viewer 101 of a hierarchical path designated by a user. The XML file viewer 101 converts the hierarchical path into a query, transmits an inquiry to the database 104, and transmits the obtained results to the hierarchical file GUI 102. The hierarchical file GUI 102 changes the received results into an icon for a folder/file present along the hierarchical path, and presents the icon to the user.

Figure 2:
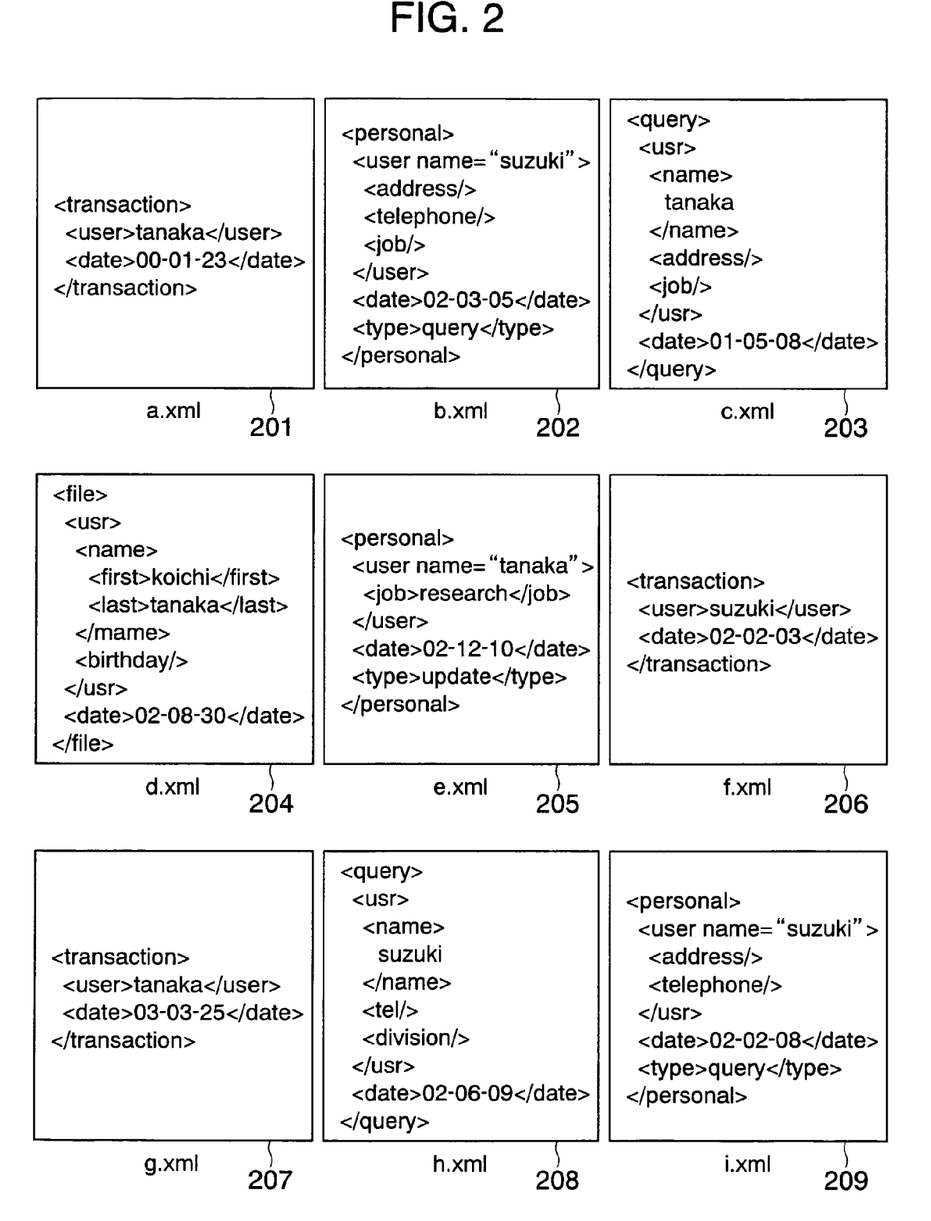
FIG. 2 is a diagram showing example XML documents for which the embodiment of the invention is applied.

XML documents 201 to 203 in FIG. 2 are examples used for the explanation of this embodiment. These XML example documents have different grammatical structures, and are stored in the storage unit 103, while the contents of the individual XML documents are stored in the database 104. Assume that the user obtains, through the hierarchical file GUI 102, the folder hierarchical expression where the XML documents are sorted as follows.

A user 105 sorts user=tanaka files in accordance with dates.

A user 106 sorts queries in accordance with users.

In this case, the XML file viewer 101 and the hierarchical file GUI 102 present a folder hierarchical expression 107 to the user 105. In the folder hierarchical expression 107, a folder 109, date<02-01-01, and a folder 110, date>01-12-31, are present under a folder 108, user=tanaka. In a window 111 where the folder 109 is opened, XML documents a.xml and c.xml, for which the user is tanaka and the date is before 02-01-01, are present. In a window 112 where the folder 110 is opened, XML documents d.xml, e.xml and g.xml, for which the user is tanaka and the date is after 01-12-31 are present.

The XML file viewer 101 and the hierarchical file GUI 102 present a folder hierarchical expression 113 to the user 106. In the folder hierarchical expression 113, a folder 115, user=tanaka, and a folder 116, user=suzuki, are present under a folder 114, query. In window 117, wherein the folder 115 is opened, XML document c.xml, which is a query and for which the user is tanaka, is present. In a window 118, wherein the folder 116 is opened, XML documents b.xml, h.xml and i.xml, which are queries and for which the user is suzuki, are present.

The overview of the embodiment has been presented. A detailed explanation will now be given for the operations of the XML file viewer 101 and the hierarchical file GUI 102, according to the embodiment, that perform the above described processing. To simplify the following explanation, only the XML example documents 201 to 204 are employed.

First, a method for this embodiment for storing XML documents in the database 104 will be described while referring to FIG. 3.

In this embodiment, the database 104 is defined as a relational database. A table in FIG. 3 has six columns, ID, VALUE, TYPE, PID, PVALUE and FILE, and the contents of the XML documents for the individual XML nodes (elements, attributes and values) are stored separately in the storage unit 103. One row in the table represents one node. The meanings of the individual columns are as follows.

ID: unique identifier for the node
TYPE: node type
VALUE: the name or value of the node
PID: ID of the parent node
FILE: the name of an XML document that the node belongs to The value of the ID is a character string that is decided by recursively connecting a character string, except for the extension ".xml", having the name of an XML document (the value for FILE) to which a node belongs, a succeeding ":", and the numerals that represent the order of the pertinent node among the siblings of the node, in the individual classes, and that are delimited by "/". For example, since the "address" element of the XML document 203 is present in an XML document having the name c.xml, the value of the ID begins with "c:". Further, since the "address" element is the second child element of the "user" element that is the first child element of the "query" element that is the first element of the document, the ID is represented by "c:/1/1/2" (the 29th row in the table in FIG. 3). This method for providing an ID is merely an example, and any character string may be employed so long as it is unique to a node.

The TYPE value is TAG when a node is an element, or "ATR" when a node is an attribute, or "PCD" when a node is a value. In addition to these TYPE values, "CMP" and "VAC" are virtual node types that are not actually present in an XML document. Hereinafter, a CMP node is called a compound node, and a VAC node is called an empty node. The compound node is a virtual node that is prepared when a parent node does not employ only a character string as a child, and the empty node is a virtual node that is prepared when the parent node is an empty node. Among the sibling nodes, the order of both the compound node and the empty node is 0.

The VALUE value is an element name when a node is an element, or an attribute name when a node is an attribute, or the value of a node when the node is a value, or "null" when a node is a compound node or an empty node.

According to the above described rules, all the nodes in the XML documents 201 to 204 are traversed with a depth-first manner, and are stored. The results are shown in the table in FIG. 3. Rows 1 to 6, 7 to 22, 23 to 34 and 35 to 38 correspond to the contents of the XML documents 201, 202, 203 and 204.

In order to extract, from this table (hereinafter this table is referred by the name "TABLE"), the types and names (or values) for all the nodes for which an element having a specific name is regarded as a parent, the following SQL sentence is employed:

SELECT T2. TYPE, T2. VALUE
   FROM TABLE AS T1,
      TABLE AS T2
WHERE T1. TYPE='TAG' AND T1. VALUE=element name
   AND T1. ID=T2. PID For example, when all the nodes that employ the "user" element as a parent, rows 4, 10, 11, 13, 15 and 17 in the table in FIG. 3 are selected, and the obtained results are {(PCD, tanaka), (CMP, null), (ATR, name), (TAG, address), (TAG, telephone), (TAG, job)}.

Further, to extract an XML document for which an element having a specific name has a specific value, the following SQL sentence is employed:

SELECT T2. FILE
   FROM TABLE AS T1,
      TABLE AS T2
WHERE T1. TYPE='TAG' AND T1. VALUE=element name
   AND T1. ID=T2. PID
   AND T2. TYPE='PCD' AND T2. VALUE=value For example, when an XML document where the value of the "user" element is "tanaka" is extracted, row 4 in the table in FIG. 3 is selected, and the obtained results are {(a.xml)}.

Furthermore, to extract an XML document for which a specific attribute of an element having a specific name has a specific value, the following SQL sentence is employed:

SELECT T3. FILE
   FROM TABLE AS T1,
     TABLE AS T2,
     TABLE AS T3
   WHERE T1. TYPE='TAG' AND T1. VALUE=element name
     AND T1. ID=T2. PID
     AND T2. TYPE='ATR' AND T2. VALUE=attribute name
     AND T2. ID=T3, PID
     AND T3. TYPE='PCD' AND T3. VALUE=value For example, when an XML document wherein the value of the "name" attribute of the "user" element is suzuki is extracted, row 12 in the table in FIG. 3 is selected, and the obtained results are {(b.xml)}.

Moreover, in order to extract an XML document wherein a specific child element (element name 2) of an element having a specific name (element name 1) has a specific value, the following SQL sentence is employed:

SELECT T3. FILE
   FROM TABLE AS T1,
     TABLE AS T2,
     TABLE AS T3
   WHERE T1. TYPE='TAG' AND T1. VALUE=element name 1
     AND T1. ID=T2. PID
     AND T2. TYPE='TAG' AND T2. VALUE=element 2
     AND T2. ID=T3.PID
     AND T3. TYPE='PCD' AND T3. VALUE=value For example, when an XML document for which the value of the "name" element, which is a child of the "user" element, is tanaka is extracted, row 28 in the table in FIG. 3 is selected, and the obtained results are {(c.xml)}.

Generally, in order to extract the types and names (or the values) of all the nodes that employ, as parents, an element having an n-level ancestor-descendent relationship (or, a specific attribute of an element having an n−1 level ancestor-descendent relationship, the following SQL sentence is employed:

SELECT Tn+1. TYPE, Tn+1. VALUE
   FROM TABLE AS T1,
     TABLE AS T2,
       :
     TABLE AS Tn
     TABLE AS Tn+1
   WHERE T1. TYPE='TAG' AND T1. VALUE=element name 1
     AND T1. ID=T2. PID
     AND T2. TYPE='TAG' AND T2. VALUE=element name 2
     AND T2. ID=T3. PID
       :
     AND Tn. TYPE='TAG' AND Tn. VALUE=element name n (or, AND Tn. TYPE='ATR' AND Tn. VALUE=attribute name)
     AND Tn. ID=Tn+1. PID Hereinafter, the SQL sentence is represented as CHILDREN (element name 1/element name 2/ . . . /element name n) or, VALUE (element name 1/element name 2/ . . . / element name n−1/@attribute name).

In addition, in order to extract an XML document for which an element having an n-level ancestor-descendent relationship (or a specific attribute of an element having an n−1 level ancestor-descendent relationship) has a specific value, the following SQL sentence is employed:

SELECT Tn+1. FILE
   FROM TABLE AS T1,
     TABLE AS T2,
       :
     TABLE AS Tn
     TABLE AS Tn+1
   WHERE T1. TYPE='TAG' AND T1. VALUE=element name 1
     AND T1. ID=T2. PID
     AND T2. TYPE='TAG' AND T2. VALUE=element name 2
     AND T2. ID=T3. PID
       :
     AND Tn. TYPE='TAG' AND Tn. VALUE=element name n or, AND Tn. TYPE='ATR' AND Tn. VALUE=attribute name)
     AND Tn. ID=Tn+1. PID
     AND Tn+1. TYPE='PCD' AND Tn+1. VALUE=value Hereinafter, the SQL sentence is represented as FILES (element name 1/element name 2/ . . . /element name n, value), or FILES (element name 1/element name 2/ . . . / element name n−1/@attribute name, value).

Based on the above described description, an explanation will now be given for the operations of the XML file viewer 101 and the hierarchical file GUI 102 according to the embodiment.

When a user designates a hierarchical path by opening a folder, the hierarchical file GUI 102 notifies the XML file viewer 101 of the hierarchical path. At this time, the hierarchical file GUI 102 also notifies a variable folder (to be described later), or a value folder (also to be described later) is designated as the hierarchical path. When the hierarchical path is a value folder, the value of the folder is also transmitted.

The XML file viewer 101 performs the following processes based on the received hierarchical path.

1. When the hierarchical path is a variable folder, the XML file viewer 101 issues SQL sentence CHILDREN (the hierarchical path) to the database 104.
2. When the hierarchical path is a value folder, the XML file viewer issues SQL sentence FILES (the hierarchical path, the value) to the database 104.

Further, the XML file viewer 101 transmits the obtained results to the hierarchical file GUI 102. The hierarchical file GUI 102 changes the received results into an icon as follows, and arranges the icon in the hierarchical path.

1. When the hierarchical path is a variable folder, the following icons are prepared for the individual TYPEs.

TAG: a folder icon for VALUE is employed as a name and the mark <> is inserted in the center.

ATR: a folder icon that employs as a name a character string obtained by adding "@" before VALUE, and to which the mark "@" is inserted in the center (hereinafter an attribute folder)

PCD: a folder icon that employs as a name a character string obtained by adding "=" before VALUE, and that has no inserted mark.

CMP, VAC: a folder icon that employs "</>" as a name and has no inserted mark.

2. When a hierarchical path is a value folder, a file icon that employs the results FILE as a name.

The variable folder is a folder icon for which some mark is provided, and the value folder is a folder icon having no mark.

While referring to FIG. 4, an explanation will now be given for the process for generating a folder hierarchical expression in accordance with the user's manipulation of the GUI 102.

When a user creates, through the hierarchical file GUI (hereinafter referred to as a GUI) 102, an element folder 402 having the name "user", in an empty folder 401, opens the element folder 402, and the GUI 102 displays a window 403. Hereinafter, in the drawings, an arrow with a black dot as a starting point means that an image, obtained by opening a folder at the starting point, appears in a window at the end point. This window is sometimes called a folder. A gray button 404 is provided at the upper left of the window 403, indication that the folder 402 (and the folder 403, representing the image for opening the folder 402) is a variable folder.

The GUI 102 notifies the XML file viewer (hereinafter referred to as a viewer) 101 of a hierarchical path "user". The viewer 101 issues SQL sentence CHILDREN (user) to the database (hereinafter referred to as a DB) 104, and rows 11, 13, 15, 17, 10 and 4 in the table in FIG. 3 are selected. The obtained results {(ATR, name), (TAG, address), (TAG, telephone), (TAG, job), (CMP, null), (PCD, tanaka)} are transmitted to the GUI 102. Based on these results, the GUI 102 generates folder icons 405 to 410, and arranges them in the folder 403. The thus generated folder hierarchical expression is presented to the user.

When the user opens an attribute folder 405, the GUI 102 displays a window 411. Since the folder 411 is a variable folder, a button 412 is provided. Further, the GUI 102 notifies the viewer 101 of the hierarchical path "user/@name", the viewer 101 issues a SQL sentence CHILDREN (user@/name), and row 12 in the table in FIG. 3 is selected. The obtained results {(PCD, suzuki)} are transmitted to the GUI 102, and based on the received information, the GUI 102 generates a folder icon 413 and arranges it in the folder 412.

When a user opens a value folder 413, the GUI 102 displays a window 414. Since the folder 413 is a value folder, not a variable folder, a button is not provided at the upper left of the window 414. Further, the GUI 102 notifies the viewer 101 of a hierarchical path "user/@name" and a value "suzuki", the viewer 101 issues SQL sentence FILES (user/@name, suzuki), and row 12 in the table in FIG. 3 is selected. The obtained results {(b.XML)} are then transmitted to the GUI 102, and based on the received information, the GUI 102 generates a file icon 415 and arranges it in the folder 414.

The data exchange hereinafter performed between the viewer 101 and the GUI 102 will not be explained.

When a user opens an element folder 406, a window 416, a button 417 and a folder 418 are displayed. The folder 418 is shown as a value folder icon that represents the results {(VAC, null)} obtained by selecting row 14 in the table in FIG. 3 in accordance with SQL sentence CHILDREN (user/address). When the folder 418 is opened, a window 419 is displayed, and SQL sentence FILES (user/address, </>) is issued. When the value is "</>", on the last line of SQL sentence FILES, AND Tn+1. TYPE='PCD' AND Tn+1. VALUE=value is replaced with AND (Tn+1. TYPE='VAC' OR Tn+1. TYPE='CMP'). An icon 420 is a file icon representing the result {(b.xml)} that is obtained by selecting row 14 in the table in FIG. 3 in accordance with the above described SQL sentence. A file icon 422, in a value folder 421, is an icon that represents row 10 in the table in FIG. 3 that is selected in accordance with SQL sentence FILES (user, </>), and a file icon 424, in a value folder 423, is an icon that represents row 4 in the table in FIG. 3, which is selected in accordance with SQL sentence FILES (user, tanaka).

Next, while referring to FIG. 5, an explanation will be given for the process for generating another folder hierarchical expression. In the following explanation, only SQL sentences used for generation of the folder hierarchical expression, and rows in the table in FIG. 3 that are selected in accordance with the SQL sentences are shown. SQL sentence CHILDREN is abbreviated as C, and the SQL sentence FILES is abbreviated as F.

| | | |
|---|---|---|
| element folder 505 | C (usr) | rows 27 and 39 |
| element folder 506 | C (usr) | row 29 |
| element folder 507 | C (usr) | row 31 |
| element folder 508 | C (usr) | row 45 |
| value folder 509 | C (usr) | rows 26 and 38 |
| element folder 512 | C (usr/name) | row 41 |
| element folder 513 | C (usr/name) | row 43 |
| value folder 514 | C (usr/name) | row 40 |
| value folder 515 | C (usr/name) | row 28 |
| value folder 518 | C (usr/name/last) | row 44 |
| file 520 | F (user/name/last, tanaka) | row 44 |
| file 522 | F (user/name, </>) | row 40 |
| file 524 | F (user/name, tanaka) | row 28 |
| file 526 | F (user, </>) | row 26 |
| file 527 | F (user, </>) | row 38 |

A variable synonymization process will now be described while referring to FIG. 6. The variable synonymization process means that a plurality of elements/attributes, differing in accordance with a grammatical structure. are defined as synonyms, and XML documents are sorted in accordance with the identity of the values of the elements/attributes.

Figure 4:
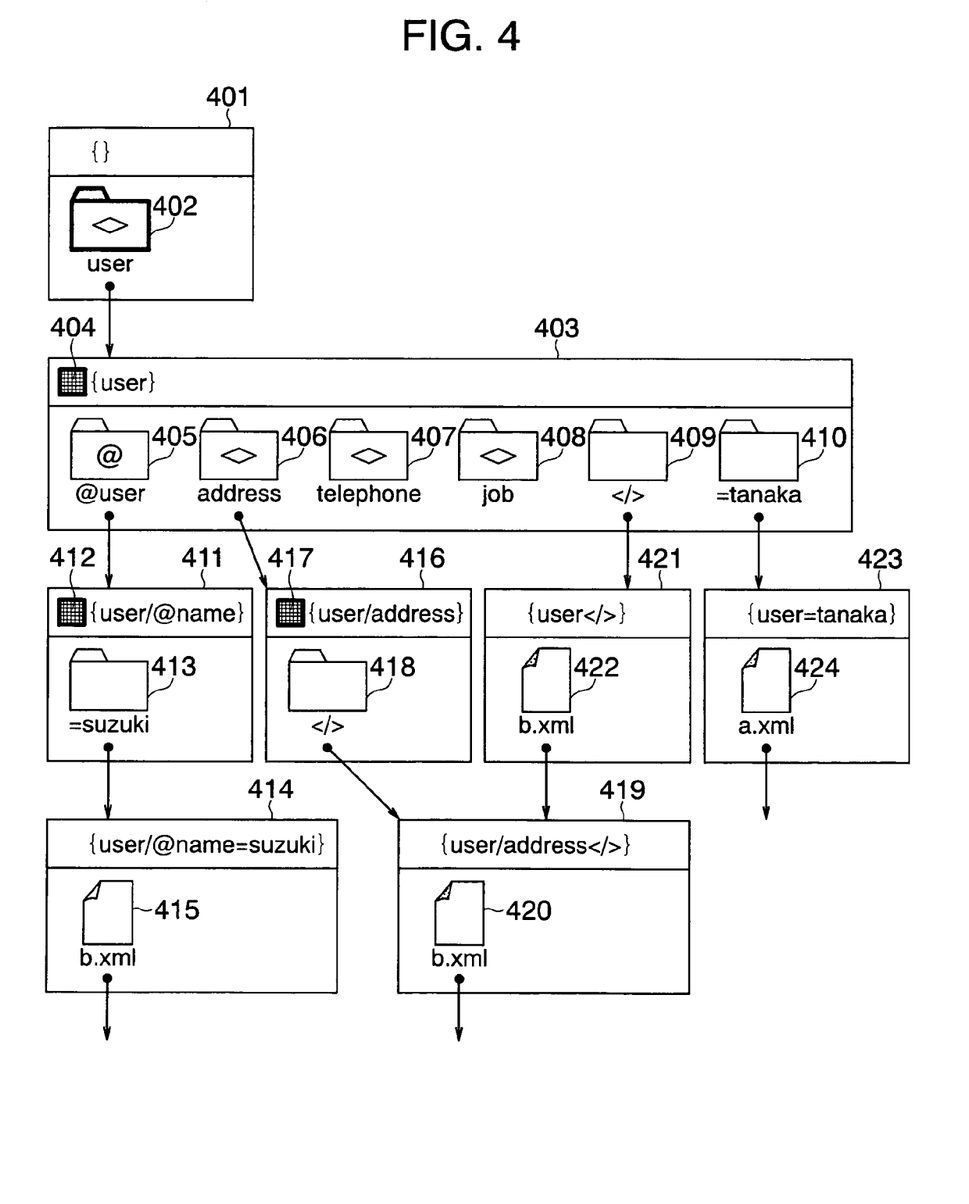
FIG. 4 is a diagram showing a folder hierarchy (1) obtained by classifying example XML documents according to the embodiment of the invention.
Figure 5:
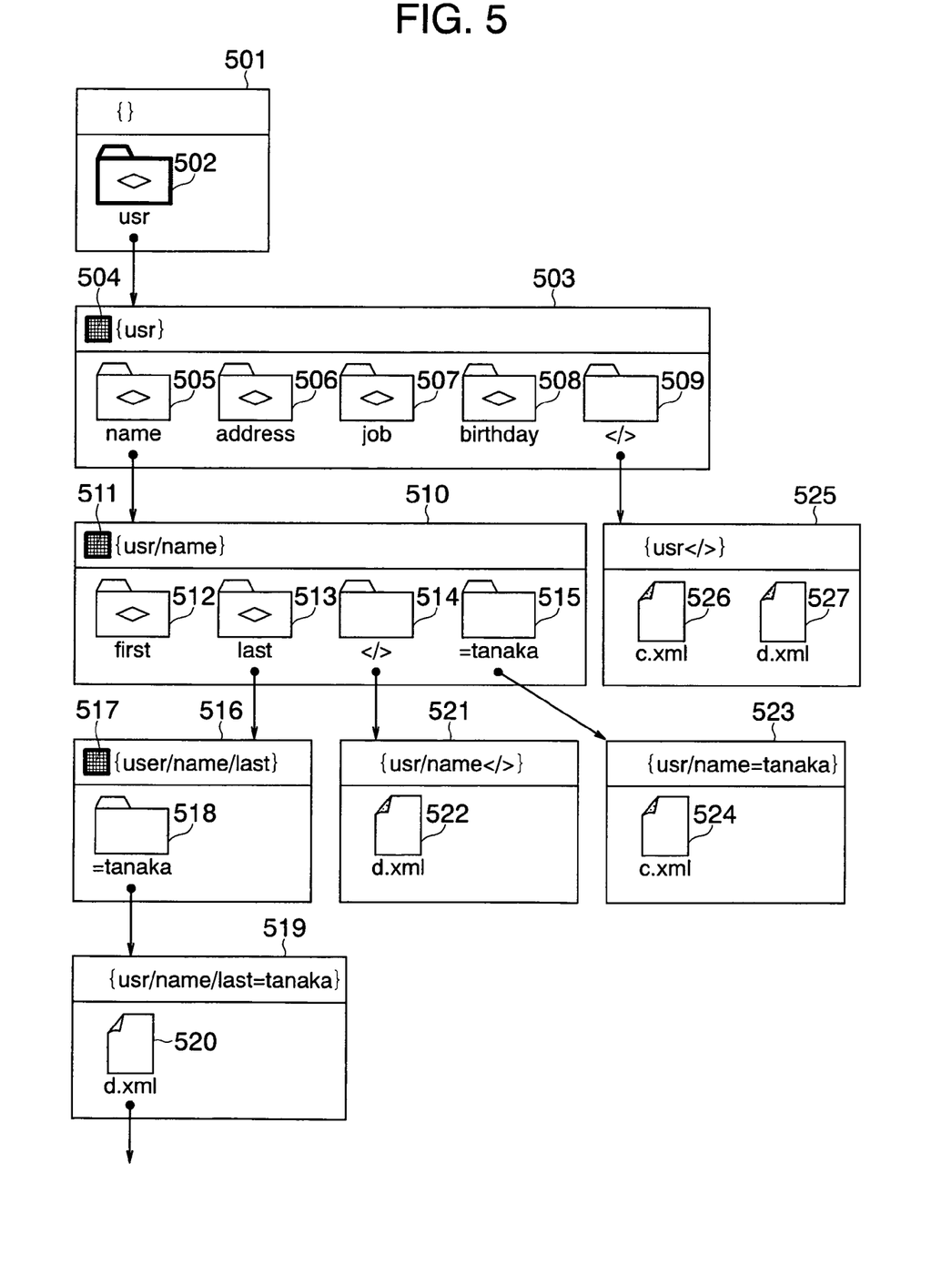
FIG. 5 is a diagram showing a folder hierarchy (2) obtained by classifying the example XML documents according to the embodiment of the invention.
Figure 6:
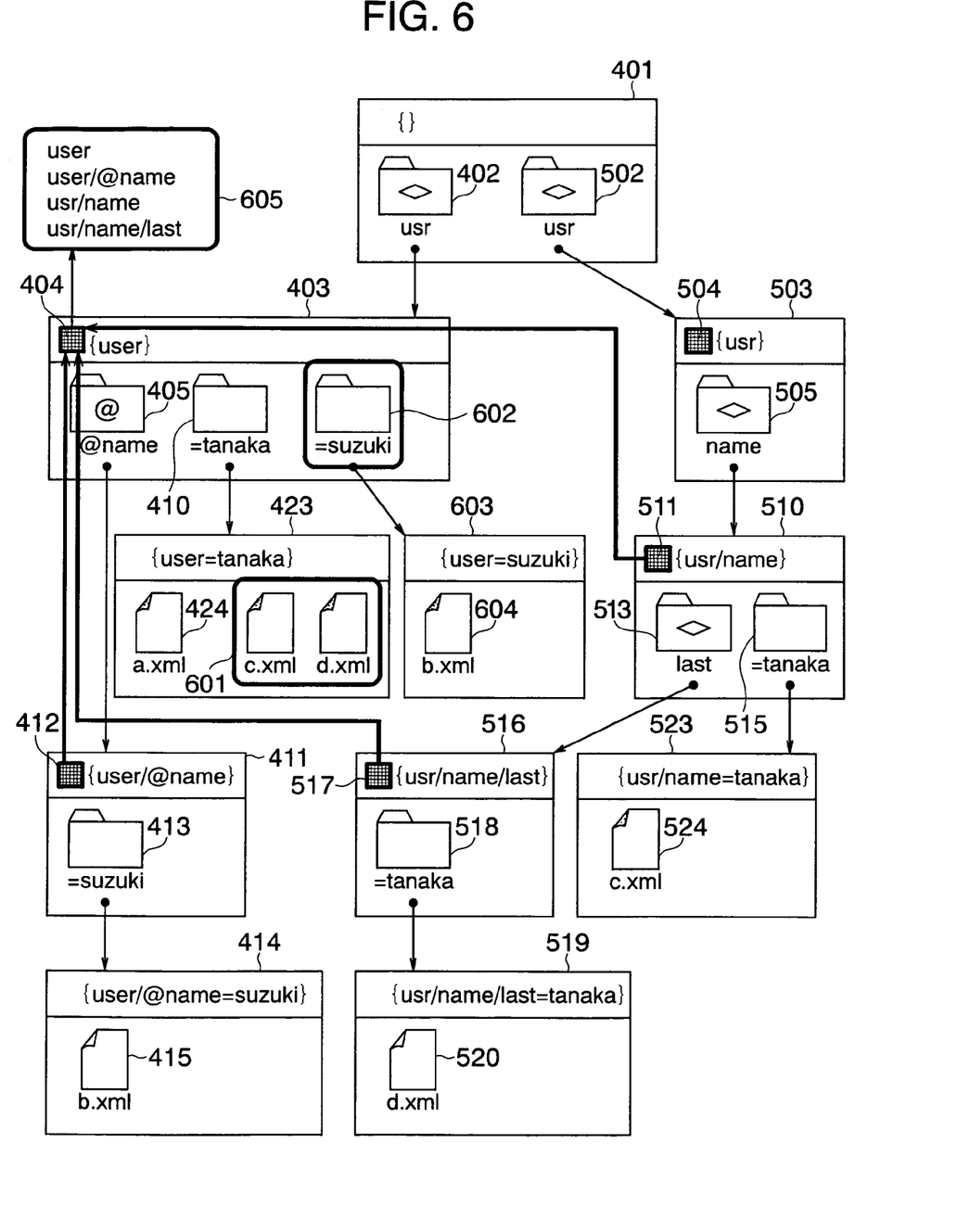
FIG. 6 is a diagram showing a variable synonymization process, according to the present invention, for the portions extracted from FIGS. 4 and 5.

In FIG. 6, only portions related to the explanation of the variable synonymization process are extracted from the items shown in FIGS. 4 and 5. An explanation will be given for an example wherein the "name" attribute of the "user" element, the "name" element of the child of the "user" element, and the "last" element of the child of the "name" element, which is the child of the "user" element, are to be synonymized with the "user" element.

A user drags and drops the button of one variable folder to the button of the other variable folder to designate the variable synonymization of two elements/attributes. The former variable folder is called a variable synonymized folder, and the latter variable folder is called a variable synonymizing folder. In this example, a button 412 of a "name" attribute folder 411 of the "user" element, a button 511 of a "name" element folder 510, which is a child of the "user" element, and a button 517 of a "last" element folder 516, which is the child of the "name" element that is the child of the "user" element, are dragged and dropped on a button 404 of a "user" element folder 403.

Upon receiving the designation by the user, the following process is performed:

For each value folder present immediately before a variable synonymized folder, when a specific value folder having the same value as the pertinent value folder is present immediately under the variable synonymizing folder, all the XML documents arranged in the pertinent value folder are arranged in the specific value folder. Then, when there is no value folder having the same name, a value folder having the same name as the pertinent value folder is generated immediately under the variable synonymizing folder, and all the XML documents arranged in the pertinent value folder are also arranged in the newly generated value folder.

In this example, since a value folder 410, which has the same name (=tanaka) as a value folder 515 present immediately under a folder 510, is present immediately under a folder 403, file c.xml in the value folder 515 is also arranged in the value folder 410. The same process is performed for file d.xml arranged n a value folder 518. These files are arranged as a file group 601 in a folder 423. On the other hand, since a value folder, which has the same name as a value folder 413 present immediately under a folder 411, is not present immediately under a folder 403, a value folder 602 having the same name (=tanaka) is generated, and file b.xml in the value folder 413 is also arranged as a file 604 in the value folder 602.

When a user depresses the button of the variable folder, the list of all the elements/attributes that are synonymized is displayed. In the example, when a user depresses a button 404, a list 605 is displayed.

Figure 7:
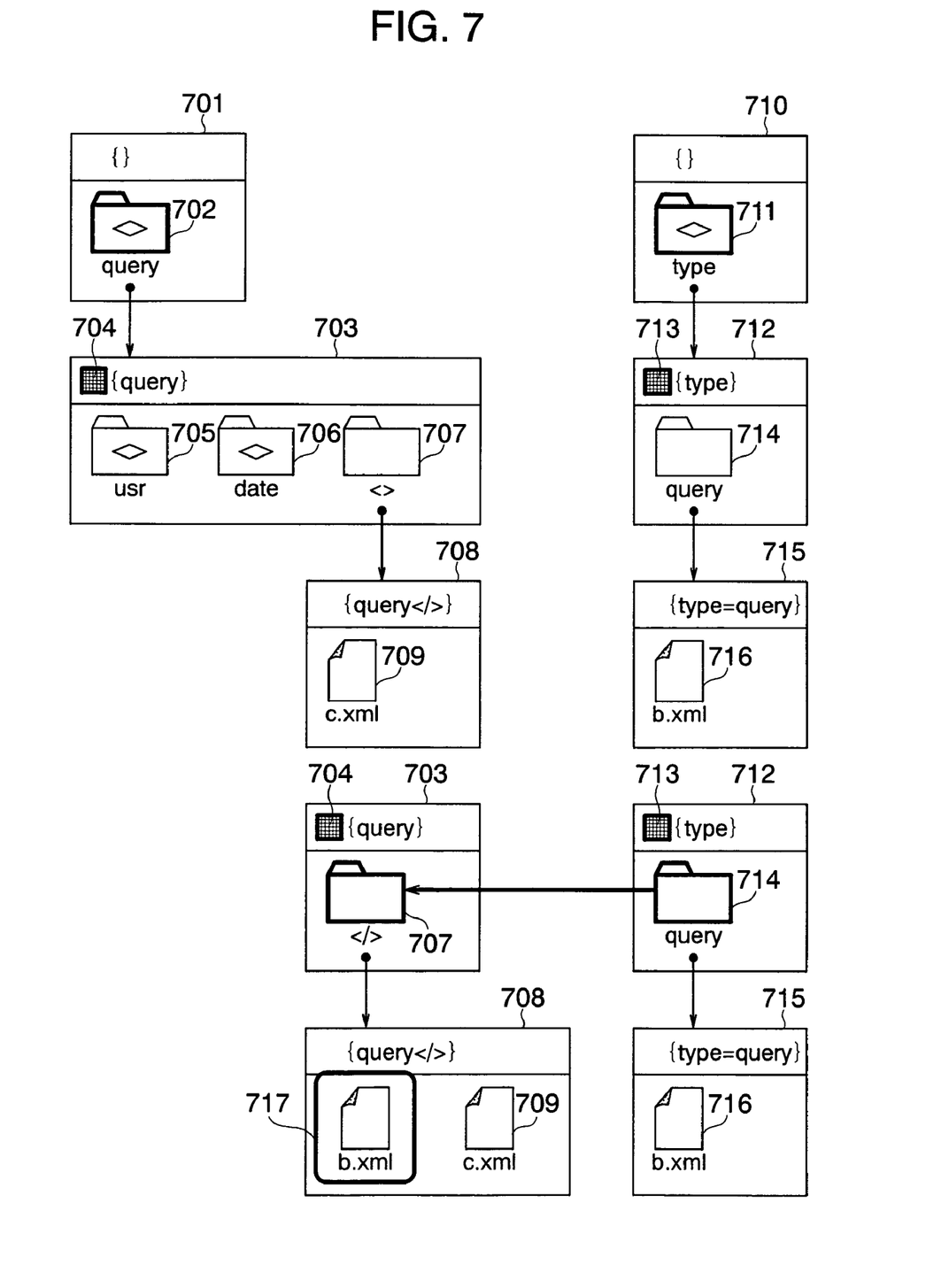
FIG. 7 is a diagram showing a folder hierarchy (3) obtained by classifying the example XML documents according to the embodiment of the invention.

The value synonymization process will now be described while referring to FIG. 7. The value synonymization process means that a plurality of relationships, each of which represents a specific element/attribute that has a specific value, are collectively defined as being synonymous, and a group of XML documents that satisfy the relationship are arranged in one folder.

First, the process for generating a folder hierarchial expression for a "query" element is shown below.

| element folder 705 | C (query) | row 25 |
| element folder 706 | C (query) | row 28 |
| value folder 707 | C (query) | row 24 |
| file 709 | F (query, </>) | row 24 |

Further, the process for generating a folder hierarchical expression for a "type" element is shown below.

| value folder 714 | C (type) | row 22 |
| file 716 | F (type, query) | row 22 |

An explanation will now be given for an example wherein the definition that the value of the "type" element is "query" is regarded as being a synonym of the definition in which the "query" is included, and the value synonymization process is performed.

A user drags and drops one value folder on the other value folder to designate the value synonymization of a relationship between two elements/attributes and values. The former value folder is called a value synonymized folder, and the latter value folder is called a value synonymizing folder. In the example, a "type=query" value folder 714 is dragged and dropped on a "query</>" value folder 707.

Upon receiving the designation made by the user, the following process is performed:

All the XML documents in the value synonymized folder are also arranged in the value synonymizing folder. In the example, file b.xml in a value folder 714 is also arranged as a file 717 in a value folder 707.

Figure 8:
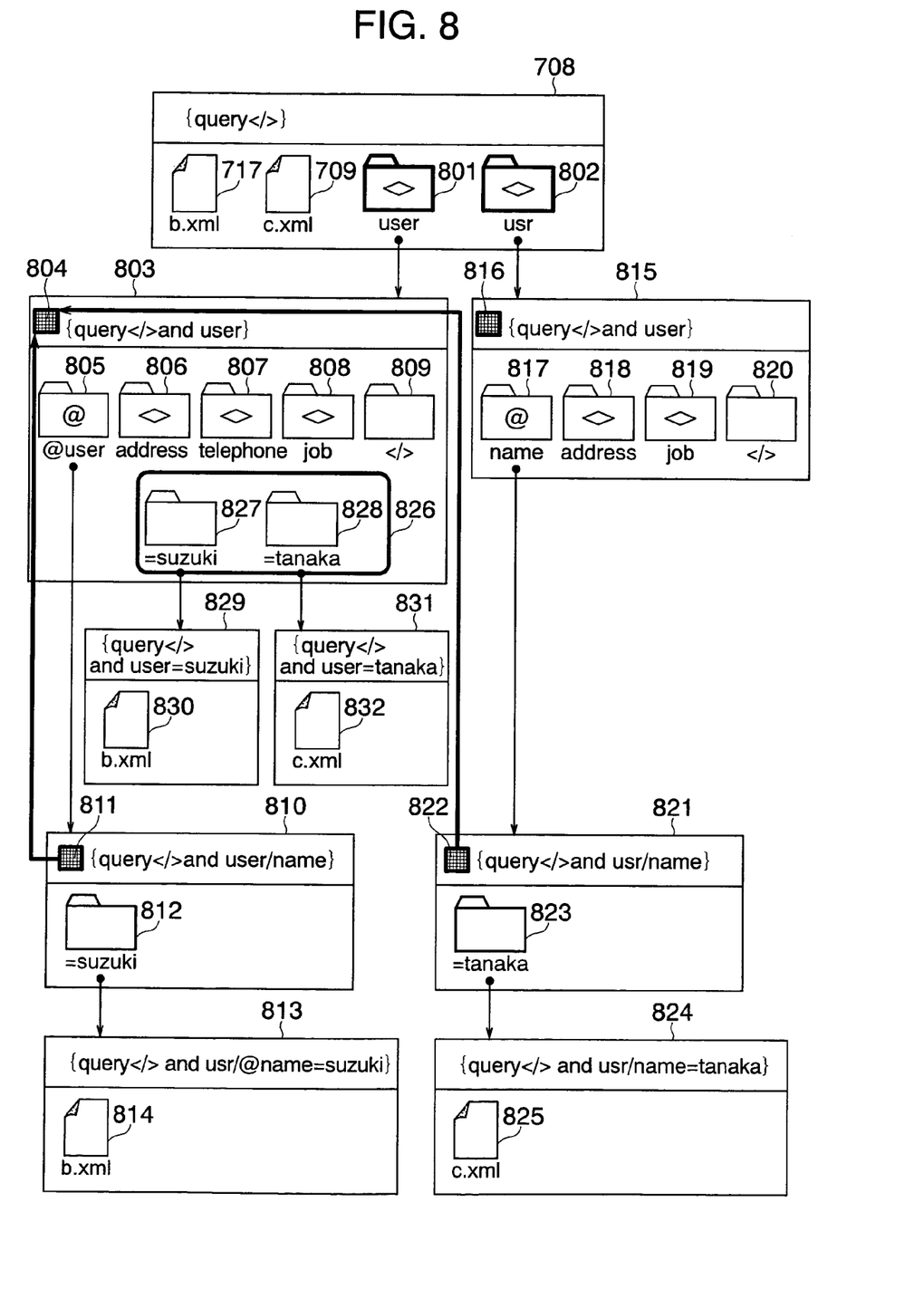
FIG. 8 is a diagram showing a folder hierarchy (4) obtained by classifying the example XML documents according to the embodiment of the invention.

A hierarchic method for classifying documents will now be described while referring to FIG. 8. This method is a method whereby XML documents that have been sorted from a specific viewpoint are classified in more detail from another viewpoint. An explanation will be given for an example wherein a "query" document extracted in FIG. 7 is further sorted in accordance with "users".

A user prepares a new element folder in one value folder wherein XML documents sorted from a specific view point are collected, and designates that these XML documents be sorted from another viewpoint. In this example, a new "user" element folder 801 and a "user" element folder 802 are additionally prepared in a value folder 708 wherein a "query" document file 709 and a file 717 are arranged. The process for generating a relevant folder hierarchical expression is shown below.

| attribute folder 805 | C (usr) | row 11 |
| attribute folder 806 | C (usr) | row 13 |
| attribute folder 807 | C (usr) | row 15 |
| attribute folder 808 | C (usr) | row 17 |
| value folder 809 | C (usr) | row 10 |
| value folder 812 | C (usr/@name) | row 12 |
| file 814 | F (usr/@name, suzuki) | row 12 |
| element folder 817 | C (usr) | row 29 |
| element folder 819 | C (usr) | row 31 |
| value folder 820 | C (usr) | row 26 |
| value folder 823 | C (usr/name) | row 28 |
| file 825 | F (usr/name, tanaka) | row 28 |

In this case, the SQL described above is performed only for node data of documents b.xml and c.xml arranged in the "query</>" value folder 708.

Further, when the variable synonymization is performed for the variable folders 810 and 821 relative to the variable folder 803, a value folder group 826 is generated immediately under the variable folder 803. The document b.xml, in a value folder 812, is arranged as a file 830 in a value folder 827, while the document c.xml, in a value folder 823, is arranged as a file 832 in a value folder 828.

Through this process, the folder hierarchical expression is provided wherein the "query" documents are further sorted in accordance with "users".

Figure 9:
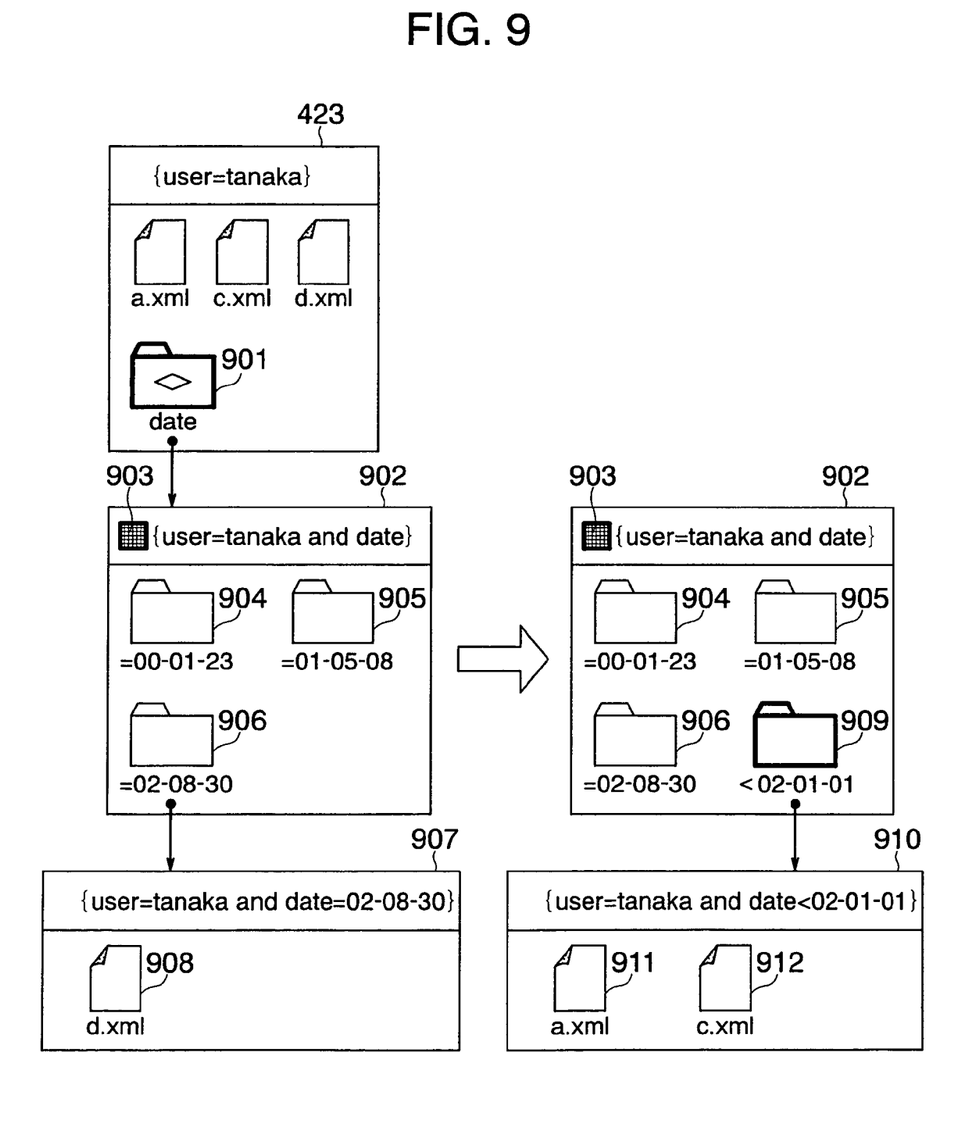
FIG. 9 is a diagram showing a classifying process under a condition for a value according to the embodiment of the invention.

Next, an explanation will be given for a method for classifying documents in accordance with a condition provided for a value. As an example, from documents "user=tanaka", extracted in FIG. 6, further documents, prepared before the date Feb. 1, 01, extracted.

First, a new "date" element folder 901 is additionally arranged in a value folder 423 wherein document files "user=tanaka", a.xml, c.xml and d.xml are arranged. Under the folder 901, value folders 904, 905 and 905 are generated through the following generation process.

| value folder 904 | C (date) | row 6 |
| value folder 905 | C (date) | row 34 |
| value folder 906 | C (date) | row 48 |

Further, a file 908 is arranged in the value folder 906 through the following generation process.

file 908 F (date, 02-08-30) row 48

In order to designate the extraction of a document under a condition provided for the value of a specific element/attribute, a user prepares, immediately under a variable folder 902, a value folder that employs as a name a character string that represents the condition. Furthermore, to extract an XML document that matches the condition, an SQL sentence is issued wherein, on the last line of SQL sentence FILES, AND Tn+1. TYPE='PCD' AND Tn+1. VALUE=element is replaced with AND Tn+1. TYPE='PCD' AND Tn+1. VALUE [condition]. So long as a condition can be written in the SQL sentence, any character string can be employed.

In this example, a value folder 909 that employs, as a name, character string "<02-01-01>", which indicates that the date is before 02-01-01, generated immediately under the variable folder 902. As a result, rows 6 and 34 are selected, and documents a.xml and c.xml are arranged as files 911 and 912 in the value folder 909.

Through this process, a folder hierarchical expression is obtained in which documents "user=tanaka" are sorted further in accordance with the range of "date".

In the above described embodiment, the XML file viewer 101 and the hierarchical file GUI 102 interact with each other. However, it is obvious that, instead of the GUI 102, a general file system including a folder or directory hierarchy having a tree structure can also interact with the viewer 101. This arrangement can be obtained when the viewer 101 provides, for a file system or a GUI, an application programming interface or a communication protocol interface that can return folders or files present along a designated hierarchical path. It is also obvious that when the process as the viewer 101 is performed by a CPU and using a memory incorporated in the storage system 103, a storage system can be provided that includes an interface for providing, for the file system or the GUI, the folder hierarchical expression shown in the embodiment.

The XML document classifying method has been described. However, it is obvious that the methods for this embodiment, i.e., the document classifying method based on the identify of the value of an element (tag) and the hierarchic method for classifying documents, which was described in the first part of the explanation while referring to FIG. 8, can also be applied as methods for classifying general tagged documents, such as SGML and HTML documents.

In this embodiment, a relational database is employed to store data in a table having five columns. However, so long as the folder hierarchical expression as in the embodiment can be generated, another form of table may be employed, or instead of a relational database, a native XML database (NXDB) may be employed. In addition, a more efficient, unique data form or algorithm may be employed. The present invention is not limited to a specific method, but rather it relates to a function specification.

According to the present invention, it is possible to identify file attributes with which multiple files, which differ in their forms but have substantially the same attributes, are consolidated. The present invention is highly applicable for a distributed file system and an archive field.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An XML document classifying method, comprising:
    extracting, from among a plurality of XML documents, stored in a storage system, only those XML documents that include an initial element having a first initial character string as a name, the first initial character string being an arbitrary character string designated by a user, wherein the extracting includes,
    (1) classifying, based on the identify of the character an initial element value, XML documents that have only a child of the initial element that is a character string; and
    (2) generating an initial element folder having the same name as the initial element, and arranging, for the individual element values, element value folders that employ the element values as names immediately under the initial element folder, and generating an initial element folder hierarchical expression wherein XML documents, the element values of which are the same as the names of the element value folders, are arranged immediately under the individual element value folders, and
    wherein the method further comprising:
    (3) when one of the element value folders is selected and a second initial character string is designated, extracting from the XML documents in the element value folders documents that include a second element having the second initial character string as a name, regarding the second "initial element as an initial element to perform operations (1) and (2), and generating a hierarchical expression wherein folders that are generated at step operation (2) and have the same name as the second initial element are arranged immediately under the element value folders, whereby an initial element folder hierarchical expression generated by recursive repetition of operations (1) to (3) is provided;
    further comprising:
    (a) when the initial element that is included in an XML document has subordinate elements as children, generating an initial element folder hierarchical expression wherein element value folders as subordinate element folders having the same name as the subordinate elements are arranged, for the individual subordinate elements, immediately under the initial element folder;
    (b) when one of the subordinate element folders is selected, regarding the selected subordinate element as an initial element to perform steps (1) and (2) and also step (a),
    whereby an initial element folder hierarchical expression generated by recursive repetition of steps (a) and (b) is provided; and displaying results of operations (1) to (3).

2. An XML document classifying method according to claim 1, further comprising:
    presenting to a user a hierarchical file/graphical user interface (hereinafter referred to as a GUI) that has the same folder icon hierarchical structure as the folder hierarchial expression that is generated;
    designating the first initial character string by employing a user operation for preparing, immediately under a root folder in the GUI, an initial element folder that employs the first initial character string as a name;
    selecting one of the element value folders using an operation for opening the element value folder in the GUI; and
    designating the second initial character string by employing a user operation for preparing, immediately under the element value folder in the GUI, an initial element folder that employs the second initial character string as a name.

3. An XML document classifying method according to claim 1, further comprising:
    presenting to a user a hierarchical file GUI that has the same folder icon hierarchical structure as the folder hierarchical expression that is generated; and
    selecting one of the subordinate element folders by employing a user operation for opening the subordinate element folder in the GUI.

4. An XML document classifying method according to claim 1, further comprising;
- when the initial element includes a group of attributes, generating an initial element folder hierarchical expression wherein element value folders as attribute folders employing the same names as the attributes are arranged, for the individual attributes, immediately under the initial element folder;
- when one of the attribute folders is selected, classifying the XML documents in accordance with the identity of the values of the attributes as attribute values;
- generating an initial element folder hierarchical expression wherein element value folders as attribute value folders that employ the attribute values as names are arranged, for the individual identical attribute values, immediately under the attribute folders, and wherein XML documents, the attribute values of which are the same as the names of the attribute value folders, are arranged immediately under the individual attribute value folders,
- whereby the folder hierarchical expression is provided.

5. An XML document classifying method according to claim 4, further comprising:
- presenting to a user a hierarchical file GUI that has the same folder icon hierarchical structure as the folder hierarchical expression that is generated; and
- selecting one of the attribute folders by employing a user operation for opening the attribute folder in the GUI.

6. An XML document classifying method according to claim 4, further comprising:
- when arbitrary two element value folders or attribute value folders collectively referred to as value folders are selected, generating and providing an initial element folder hierarchical expression wherein all the XML documents arranged immediately under one of the value folders as a value synonymized folder are also arranged immediately under the other value folder as a value synonymizing folder.

7. An XML document classifying method according to claim 6, further comprising:
- presenting to a user a hierarchical file GUI that has the same folder icon hierarchical structure as the folder hierarchial expression that is generated; and
- selecting the value synonymized folder and the value synonymizing folder by employing a user operation for dragging and dropping the value synonymized folder in the GUI on the value synonymizing folder.

8. An XML document classifying method according to claim 4, further comprising:
- when arbitrary two initial element folders, subordinate element folders or attribute folders, collectively referred to as variable folders, are selected, and when value folders that employ the same names as all the value folders arranged immediately under one of the variable folders as a variable synonymized folder, are already arranged immediately under the other variable folder as a variable synonymizing folder, arranging, immediately under the value folders in the variable synonymizing folder, all the XML documents arranged immediately under the value folders in the variable synonymized folder; and
- when value folders having the same names as the value folders in the variable synonymized folder are not present immediately under the variable synonymizing folder, generating and providing an initial element folder hierarchical expression wherein folders having the same names as the value folders are arranged immediately under the variable synonymizing folder, and wherein all the XML documents arranged immediately under the value folders are also arranged immediately under the folders having the same name as the value folders.

9. An XML document classifying method according to claim 8, further comprising:
- presenting to a user a hierarchical file GUI that has the same folder icon hierarchical structure as the folder hierarchical expression that is generated; and
- selecting the variable synonymized folder and the variable synonymizing folder by employing a user operation for dragging and dropping the variable synonymized folder in the GUI on the variable synonymizing folder.

10. An XML document classifying method according to claim 4, further comprising:
- when an arbitrary variable folder is selected and a character string representing a condition for a value is designated, extracting, from all the XML documents arranged immediately under all the value folders that are arranged immediately under the arbitrary variable folder, only XML documents wherein a variable having a value consonant with the condition is included;
- generating an initial element folder that employs as a name a character string representing the condition, generating and providing an initial element folder hierarchical expression wherein the folder is arranged immediately under the arbitrary variable folder, and the extracted XML documents are arranged immediately under the folder.

11. An XML document classifying method according to claim 9, further comprising:
- presenting to a user a hierarchical file GUI that has the same folder icon hierarchical structure as the folder hierarchical expression that is generated;
- selecting a variable folder by employing a user operation for opening the variable folder in the GUI; and
- designating a character string representing a condition by employing a user operation for preparing, immediately under the variable folder in the GUI, an initial element folder that employs as a name an element value that represents the condition.

12. A storage system that has an interface for providing, for a file system, a GUI or a software component having an arbitrary form, an initial element folder hierarchial expression that is generated in accordance with an XML document classifying method according to claim 1.

* * * * *